United States Patent
Goodsitt et al.

(10) Patent No.: US 11,893,961 B2
(45) Date of Patent: Feb. 6, 2024

(54) AUTOMATICALLY ADJUSTING SCREEN BRIGHTNESS BASED ON SCREEN CONTENT

(71) Applicant: Capital One Services, LLC, McLean, VA (US)

(72) Inventors: Jeremy Edward Goodsitt, Champaign, IL (US); Vincent Pham, Champaign, IL (US); Austin Grant Walters, Savoy, IL (US); Anh Truong, Champaign, IL (US); Galen Rafferty, Mahomet, IL (US); Reza Farivar, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/969,115

(22) Filed: Oct. 19, 2022

(65) Prior Publication Data
US 2023/0042639 A1 Feb. 9, 2023

Related U.S. Application Data

(62) Division of application No. 16/847,715, filed on Apr. 14, 2020, now Pat. No. 11,508,333, which is a division of application No. 16/596,376, filed on Oct. 8, 2019, now Pat. No. 10,665,204.

(51) Int. Cl.
*G06N 3/08* (2023.01)
*G09G 5/10* (2006.01)
*G06N 3/04* (2023.01)

(52) U.S. Cl.
CPC ............... *G09G 5/10* (2013.01); *G06N 3/04* (2013.01); *G06N 3/08* (2013.01); *G09G 2320/00* (2013.01); *G09G 2320/062* (2013.01); *G09G 2320/0646* (2013.01); *G09G 2320/103* (2013.01);
(Continued)

(58) Field of Classification Search
None
See application file for complete search history.

(56) References Cited

U.S. PATENT DOCUMENTS

| | | | | | |
|---|---|---|---|---|---|
| 2008/0252629 | A1* | 10/2008 | Chiang | .................... | G09G 3/20 345/207 |
| 2011/0037781 | A1* | 2/2011 | Kangas | ................ | G09G 3/3406 345/690 |
| 2016/0293139 | A1* | 10/2016 | Kwon | ................ | G06F 3/03547 |

(Continued)

OTHER PUBLICATIONS

Feuz, Sandro and Deselaers, Thomas, "Screen brightness adjustment using machine learning", Technical Disclosure Commons, (Feb. 1, 2019), https://www.tdcommons.org/dpubs_series/1923 (Year: 2019).*

*Primary Examiner* — Parul H Gupta
(74) *Attorney, Agent, or Firm* — KDW Firm PLLC (57) ABSTRACT

Disclosed are examples for adjusting screen brightness based on screen content being presented on a display screen of a mobile device. The described examples may determine a time at which the screen content is to be evaluated. The screen content is categorized based on the evaluation. A category of the screen content may be input into a machine learning algorithm that may be used to determine whether a screen brightness adjustment is appropriate. If a screen brightness adjustment is appropriate, a degree of the screen brightness adjustment may be determined.

20 Claims, 5 Drawing Sheets

(52) U.S. Cl.
CPC ... *G09G 2354/00* (2013.01); *G09G 2360/144* (2013.01); *G09G 2360/145* (2013.01)

(56) References Cited

U.S. PATENT DOCUMENTS

| | | | |
|---|---|---|---|
| 2017/0060391 A1* | 3/2017 | Jun | G06F 3/0482 |
| 2019/0043441 A1* | 2/2019 | Reicher | H04N 5/57 |
| 2019/0220438 A1* | 7/2019 | Pal | G06F 9/5055 |

* cited by examiner

210 — DETERMINE A TIME TO EVALUATE SCREEN CONTENT BEING PRESENTED ON A MOBILE DEVICE DISPLAY

220 — EVALUATE SCREEN CONTENT UTILIZING A FIRST MACHINE LEARNING ALGORITHM

230 — BASED ON AN OUTPUT OF THE FIRST MACHINE LEARNING ALGORITHM, CATEGORIZE THE SCREEN CONTENT BEING PRESENTED ON THE MOBILE DEVICE DISPLAY

240 — BASED ON A CATEGORY OF THE SCREEN CONTENT, DETERMINE THAT A SCREEN BRIGHTNESS ADJUSTMENT IS APPROPRIATE

250 — IN RESPONSE TO DETERMINING THAT THE SCREEN BRIGHTNESS ADJUSTMENT IS VALID, DETERMINE A DEGREE OF THE SCREEN BRIGHTNESS ADJUSTMENT

260 — ADJUST THE SCREEN BRIGHTNESS ACCORDING TO THE DETERMINED DEGREE OF SCREEN BRIGHTNESS ADJUSTMENT

AUTOMATICALLY ADJUSTING SCREEN BRIGHTNESS BASED ON SCREEN CONTENT

RELATED APPLICATIONS

This application is a divisional of U.S. patent application Ser. No. 16/847,715, filed Apr. 14, 2020, which is a divisional of U.S. patent application Ser. No. 16/596,376, titled "AUTOMATICALLY ADJUSTING SCREEN BRIGHTNESS BASED ON SCREEN CONTENT" filed on Oct. 8, 2019. The contents of the aforementioned application are incorporated herein by reference in their entirety.

TECHNICAL FIELD

The examples herein generally relate to a brightness setting for a mobile device display screen based on the content presented on the screen.

BACKGROUND

The capabilities of mobile devices to adjust their screen brightness in response to different inputs or settings. Some mobile device operating systems keep track of a user's brightness setting changes and automatically applies similar brightness settings in similar lighting conditions. However, these brightness setting changes are based on lighting conditions and do not factor in the type of screen content being presented. Other operating systems may permit applications to run that automatically changes the screen brightness based on screen brightness settings. For example, if a user is viewing a dark window in an application, some applications may change the screen brightness settings to brighten the screen.

Hence, it would be beneficial if automatic adjustments in screen brightness accounted for the screen content being presented on a display of a mobile device.

SUMMARY

An example of a method is disclosed that includes determining a time to evaluate screen content being presented on a mobile device display. At the determined time, screen content may be evaluated utilizing a first machine learning algorithm. The screen content being presented on the mobile device display may be categorized based on an output of the first machine learning algorithm. Based on a category of the screen content, a screen brightness adjustment may be determined to be appropriate. In response to determining that the screen brightness adjustment is appropriate, a degree of the screen brightness adjustment may be determined. The screen brightness is adjusted according to the determined degree of the screen brightness adjustment.

An example of a mobile device is disclosed that includes a screen brightness adjustment application. The screen brightness adjustment application may be stored in a memory of the mobile device and executable by a processor of the mobile device. Execution of the screen brightness adjustment application enables the mobile device to perform functions. The functions detecting an input to the mobile device requesting a screen brightness adjustment. An application presenting screen content on the display device when the input for the screen brightness adjustment is detected is identified. The identified application is identified by an application identifier. The application identifier may be input into a machine learning algorithm that is operable to categorize screen content. In response to an output from the machine learning algorithm, the screen content being presented on the display device may be categorized. An ambient light indication may be received from the ambient light sensor. The executing screen brightness adjustment application may access a screen brightness adjustment model into which may be input the application name, an indication of the categorized screen content, and the ambient light indication. The screen brightness may be adjusted based on an output from the screen brightness adjustment model.

Disclosed is an example of a non-transitory computer readable medium embodying programming code that when executed by a processor causes the processor to perform functions. The functions include detecting at a specified time, a scene being presented on a display of a mobile device. The screen content being presented in the detected scene may be categorized. a screen brightness setting of the display of the mobile device may be retrieved. An indication of ambient light may be received from an ambient light sensor. A category of the categorized screen content, the retrieved screen brightness setting, and the received indication of ambient light may be input into a first machine learning algorithm. Whether a screen brightness adjustment to the determined screen brightness setting is appropriate may be determined based on an output of the first machine learning algorithm. A threshold for a degree of screen brightness adjustment may be determined using a screen brightness adjustment history. The degree of screen brightness adjustment may be determined based on the determined threshold for the degree of screen brightness adjustment. A brightness of the display of the mobile device may be adjusted according to the determined degree of screen brightness adjustment.

DETAILED DESCRIPTION

The following examples illustrate improvements to automatically adjusting screen brightness based on presented screen content. Some examples utilize an evaluation of the presented content as well as input from environmental sensors to adjust screen brightness. Advantageously, the disclosed examples provide an improved capability to adjust screen brightness based on the presented content to enhance the presentation of the screen content. For example, by adjusting the screen brightness when presenting machine-readable codes, the readability of machine-readable codes by scanning devices may be improved.

Reference is now made to the drawings, wherein like reference numerals are used to refer to like elements throughout. In the following description, for purpose of explanation, numerous specific details are set forth in order to provide a thorough understanding thereof. It may be evident, however, that the novel examples can be practiced without these specific details. In other instances, well-known structures and devices are shown in block diagram form to facilitate a description thereof. The intention is to cover all modification, equivalents, and alternatives within the scope of the claims.

Figure 1:
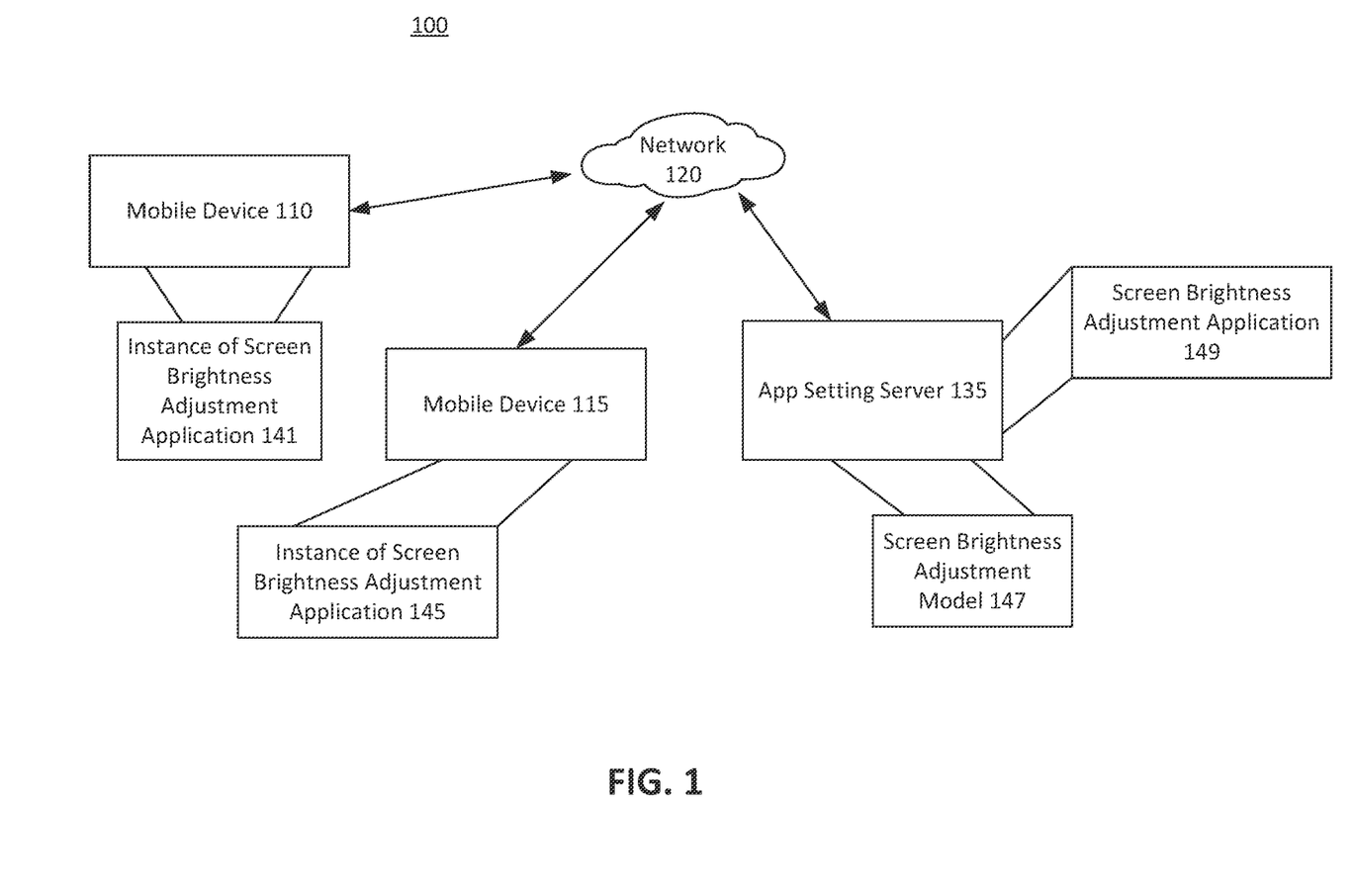
FIG. 1 illustrates an example of a system suitable for implementing a screen brightness adjustment application and application server.

FIG. 1 is an example of an implementation of a system usable with an application configured to adjust screen brightness according to process examples.

The system 100 may include mobile devices 110 and 115, a data network 120, and an application setting server 135. The data network 120 may be operable to facilitate the exchange of data between the mobile devices 110 and 115 and the application setting server 135. Each mobile device 110 and 115 may be operable to execute an instance of a screen brightness adjustment application 141 and 145, respectively.

The instances of the screen brightness adjustment applications 141 and 145, may be operable to perform automatic adjustment of the brightness of the display screen of the respective mobile devices 110 and 115 based on the content being presented on the respective mobile device 110 or 115, and other measurements and information provided by the respective mobile device 110 or 115.

The instances of the screen brightness adjustment applications 141 and 145 are copies of screen brightness adjustment application 149 maintained by the application setting server 135. The application setting server 135 may perform a number of functions including providing the instances of the screen brightness adjustment application, such as 141 and 145 to a requesting mobile device, such as mobile devices 110 and 115, and providing updated information related to screen brightness adjustment settings. For example, the application setting server 135 may receive information from the respective mobile devices 110 and 115 (as well as other devices not shown for ease of discussion and illustration) that the application setting server 135 analyzes to determine screen brightness adjustment settings or degree of screen brightness adjustments based on, for example, historical user preferences for particular content, such as video or photographs, geographical location preferences, preferences related to a type of mobile device, such as a laptop, a mobile phone (e.g., Samsung S7 Active® vs iPhone X®), a type of display on the mobile device (which may be obtained along with other information from the mobile device or a user upon registering the mobile device with the application), geographical information, or other information. In addition, the instances of the screen brightness adjustment application may keep track of settings (e.g., when, where, what applications and the like) for screen brightness adjustments and the degree of screen brightness adjustments (e.g., how much the screen brightness being adjusted based on the when, where, what applications and the like of the screen brightness adjustment settings). The degree of adjustment of the screen brightness may be in whatever units that the mobile device operating system or the screen brightness adjustment application uses for changes in screen brightness.

In an example, the application setting server 135 may receive information from the mobile devices executing the respective instances of the screen brightness adjustment application 149. For example, while most data is local to the mobile device, there may be a central service that keeps track of all user's interactions related to adjusting screen brightness as well as user's screen brightness adjustments and settings. In the example, the screen brightness adjustment application 149 (as well as instances or may include a report back feature (that may be opted into or out of by the user) to the application setting server so general user habits related to the screen brightness adjustment service provided by the screen brightness adjustment application across multiple users may be analyzed and used to train the respective first and/or second machine learning algorithms being used by the screen brightness adjustment application. This allows for a standardized model of the screen brightness adjustment model 147 to be loaded onto a mobile device so there is some starting point for providing the screen brightness adjustment service. The standardized model may include an ambient light sensor compensation, or the like.

In some examples, the standardized model of the screen brightness adjustment model 147 may be customized depending, for example, upon a type (or manufacturer) of mobile device (e.g., a Samsung device, an Apple device, a laptop, or the like. Similar mobile devices may be populated with a same customized or standardized model. In addition, the respective standardized screen brightness adjustment model 147 that may be loaded on and used by a respective mobile device may be updated as the degree of screen brightness adjustment being made to the screen brightness are applied or modified by individual users on a respective mobile device.

Figure 2:
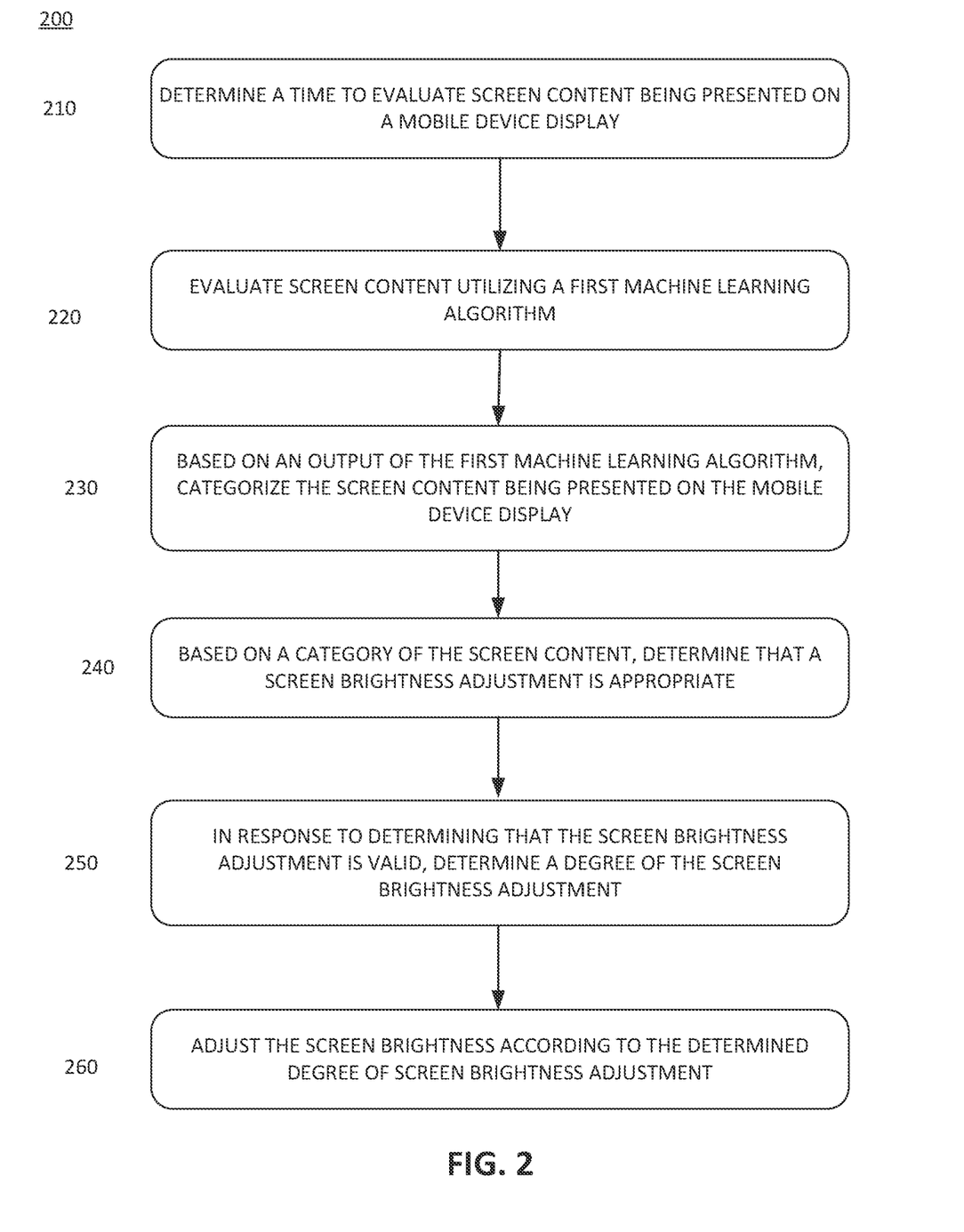
FIG. 2 shows a flow chart of an example of a process for adjusting screen brightness.

FIG. 2 illustrates an example of a process for adjusting a screen brightness based on content being presented on a display. In the example process 200, the screen brightness adjustment application, such as instance of the screen brightness adjustment application 141 executing on mobile device 110, may perform functions including determining a time to evaluate screen content being presented on a mobile device display (210). For example, the application working with inputs from the operating system may detect an occurrence of a set event related to presenting the screen content on the mobile device display. An advantage of determining a time when to determine what scene is being presented on screen is avoid having to waste battery life continuously detecting scene being presented on the scene. Detected events related to changes in brightness may be used to generate data that is stored in a database. The data stored in the database may be used to generate the model to predict what the brightness of the screen should be based on user preferences, time of day, velocity, battery life of the mobile device, Wi-Fi connectivity (including both public and private network, a universal data set, and/or other factors. It will be a dynamic model that is updated as the user continues to use the feature and data is generated.

The set event may be one of a number of set events, such as a change of location from a bright sun location to a dark location or vice versa, a change from presenting a video, such as a movie or news, to presenting a QR code or the like. Additional rules and examples of set events may be described in the following examples. In the example, in response to the detected occurrence of the set event, a look-up table having a number of times associated with the set event may be accessed. Based on an identification of the set event, a time from the look-up table is selected. Of course, the algorithm may have rules to avoid ambiguity in selecting a time to evaluate the screen content. Upon selection of the time, the screen brightness adjustment application may obtain information from the operating system and/or applications running on the mobile device. For example, the application may access information output by a graphical rendering process of the operating system or other process associated with an application rendering content on a display device of the mobile device. In addition, application may receive information from other components of the mobile device, for example, a measurement of ambient light intensity from an ambient light sensor of the mobile device executing the instance of the application (shown in another example). The measurement of the ambient light intensity may be used in the evaluation of the screen content.

Examples of a set event may include a passage of a predetermined amount of time, a change from a first application presenting screen content on the mobile device display to a second application presenting different screen content on the mobile device display, a selection of a different application from an application currently presenting screen content on the mobile device display, a detection of an input to a user interface of the mobile device to change the screen brightness, a determination that the mobile device is at a predetermined location related to a brightness change history, a calendar setting, a time of day, a time of year, a combination of the foregoing events, or the like.

At the determined time, the application may evaluate the screen content utilizing a first machine learning algorithm (220) using the obtained information needed to make an evaluation. The evaluation of the screen content may include detecting what type of scene or object is being presented on or about to be presented on the screen. The evaluation may be performed at the rendering level of the operating system. A machine learning algorithm such as categorical neural network or the like, that are already known for use in scene detection, may be used. For example, the input to the categorical neural network may be a categorical variable, which is a variable that can take on one of a limited, and usually fixed number of possible values, assigning each individual or other unit of observation to a particular group or nominal category on the basis of some qualitative property (e.g., fast motion, multiple colors (i.e., colorful), minimal change, monochromatic, or the like). Alternatively, or in addition, histogram patterns may be obtained of the presented content, color or luminance patterns may also be obtained. For example, pixel luminance intensity values of screen content presented on the mobile device display at a predetermined sampling rate over a predetermined period of time may be determined. A histogram may be generated based on the obtained pixel luminance intensity values. The values from the histogram may be input into a machine learning algorithm, such as a neural network, to determine features of the screen content that are to be included in a model of the screen content.

In an example, the model may categorize the screen content presented on the display of the mobile device. Examples of the features of screen content may be color, motion, shot length, rate of change of color, brightness, contrast, shadows, pixel value of a predetermined number of pixels in the display screen or presented screen content (e.g., obtained for example from a screen capture) or the like. A predetermined number of pixels may be a sampling of pixels in a screen capture, all of the pixels or some other grouping of pixels from the screen capture, or from the presented screen content. Alternatively, or in addition, color values may be obtained, and a histogram of the color balance may be generated and used to determine features of screen content. All of the obtained information may be used in a model suitable for evaluating the scene. Furthermore, the content delivery application that is presenting content on the display device may be obtained as the content delivery application, such as YouTube or the like may be a video serving application, a news serving application or another content delivery application that presents specific categories of content. Using the obtained information, the screen brightness adjustment application may be operable to determine what is happening in the scene, what is in scene, what content delivery application it is on.

In a particular example, the screen brightness adjustment application may determine that a video is being presented. In the past, the user may have manually set a brightness value to a screen brightness adjustment degree Z. The processor may continue evaluating the scene to determine a type of scene. For example, a type of scene may be a scene with scene with minimal changes in pixel values, such as a nature scene, a scene with many changes in pixel values, such as an action scene, a scene with moderate number of changes in pixel values, such as scenes with people or animals, that is correlated to the video. An ambient light measurement value may also be obtained. Based on the type of scene correlated to the video and ambient light having a value of X, the screen brightness adjustment application may determine that the degree of screen adjustment is a value YY, which may be in an approximate range of Z (the degree of screen brightness adjustment made by the user when video is presented on the mobile device screen).

At 230, based on an output of the first machine learning algorithm, the screen content being presented on the mobile device display may be categorized. For example, categories of content may be video, photographs, news or book content, social media pages, a QR code, or the like.

In an example, the screen brightness adjustment application may obtain a screen shot of the screen content being presented. The obtained screen shot may be processed to gather pixel luminance intensity values of, for example, a sample of all of the pixels in the obtained screen shot. The gathered pixel luminance intensity values may be input into a categorical neural network or another machine learning algorithm that has performance similar to the categorical neural network. The output from the categorical neural network may indicate a category of the screen content in the obtained screen shot Based on the category of the screen content, the screen brightness adjustment application may determine that a screen brightness adjustment is appropriate (240). In response to determining that the screen brightness adjustment is appropriate, a degree of the screen brightness adjustment may be determined (250). The degree of the screen brightness adjustment may be determined in several ways. For example, the degree of the screen brightness adjustment may be determined using a look-up tables, a second machine learning algorithm, a user preference setting related to a category of the screen content, a setting related to a category of the screen content provided by an external server, or the like. In an example, the second machine learning algorithm may include a rules-based algorithm, an unsupervised clustering algorithm, a screen brightness adjustment model, or supervised clustering algorithm.

In an example using a second machine learning algorithm, a degree of screen brightness adjustment may be determined based on inputs to the second machine learning algorithm selected from: a user preference setting, an identity of an application presenting screen content on the mobile device display, an identity of an application selected to present content on the mobile device display, a measurement of ambient light intensity, or a user history. Alternatively, the screen brightness adjustment may be determined by selecting a rule from a number of rules. For example, a rule book may be stored in a memory of the mobile device or in a memory device coupled to an application setting server or the like. In the example, selection of the rule may be based on a category of the categorized screen content resulting from evaluating the screen content. In an example of generating the rules that are used in determining the degree of screen brightness adjustment, thresholds may be generated for use in the plurality of rules by applying a third machine learning algorithm to a history of brightness adjustments. In the example, the third machine learning algorithm may be supervised machine learning algorithm. The generation of the thresholds may include inputting ambient light readings included in the history of brightness adjustments into the third machine learning algorithm.

In an example of the use of thresholds, a threshold for a screen brightness adjustment may be adjust brightness when the degree of screen brightness adjustment (either an increase or a decrease) exceeds six percent of a present screen brightness setting. The determined degree of screen brightness adjustment may be five percent, so as a result the screen brightness is not adjusted, and the process 200 may restart at 210.

Alternatively, the degree of screen brightness adjustment may meet or exceed the screen brightness adjustment threshold, in which case, at 260, the screen brightness may be adjusted according to the determined degree of screen brightness adjustment.

Figure 3:
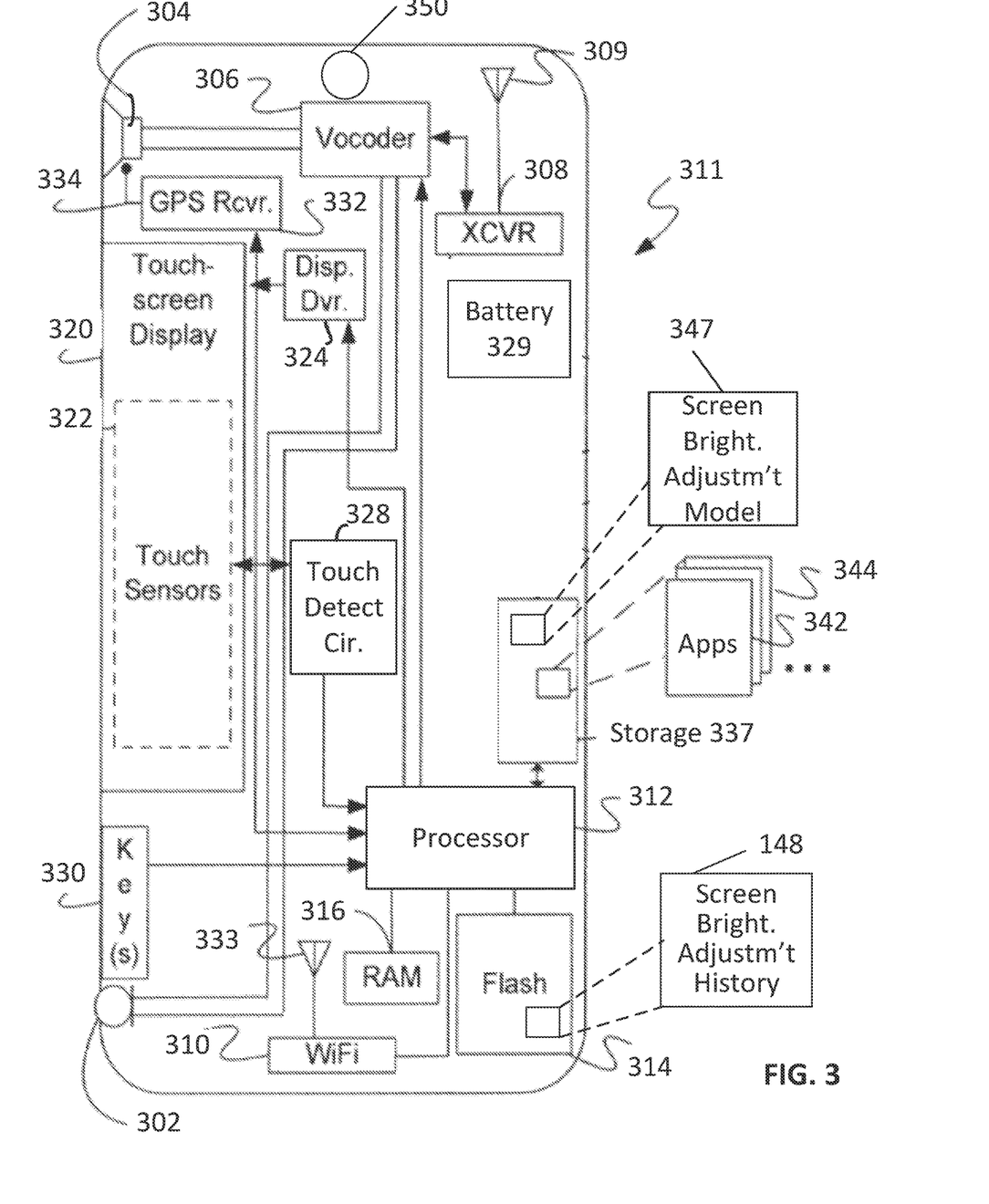
FIG. 3 illustrates an example of a mobile device suitable for implementing the techniques for adjusting screen brightness as discussed herein.

It may be beneficial to now describe an example of a mobile device suitable for implementing an example application that causes the mobile device to perform a functions of a process for adjusting a screen brightness of a display device. FIG. 3 illustrates an example of a mobile device suitable for implementing the techniques for adjusting screen brightness as discussed herein.

The mobile device 311 may be a smart phone including a display device, such as a touch screen display 320. The touch screen display 320 may be coupled to the processor 312 and be operable to present screen content. Examples of touch screen type mobile devices, such as mobile device 311, may include (but are not limited to) a smart phone, personal digital assistant (PDA), tablet computer, smart watch, or another portable device. However, the structure and operation of mobile device 311 that utilizes a touch screen is provided by way of example; and the subject technology as described herein is not intended to be limited thereto. For purposes of this discussion, FIG. 3 provides a block diagram illustration of an example of the mobile device 311 having a touch screen display for displaying content and receiving user input as (or as part of) the user interface.

There are a variety of ways that a mobile device 311 may be configured to obtain information as to current location of the device. In our example, the mobile device 311 includes a global positioning satellite (GPS) receiver 332 and associated antenna 334. GPS is a space-based satellite navigation system that provides location and time information practically anywhere on Earth. A rechargeable battery 129 may provide electrical power sufficient to power the various components of the mobile device 311.

A mobile device supporting the screen brightness adjustment application and techniques described herein may include a variety of different types of user interface elements. For discussion purposes, in the smart phone example of a mobile device shown in FIG. 3, the user interface elements of mobile device 311 include a touch screen display 320 (also referred to herein as "touch screen 320" or "display 320"). For output purposes, the touch screen 320 includes a display screen, such as a liquid crystal display (LCD) or the like. For input purposes, touch screen display 320 includes a plurality of touch sensors 322. Other interface elements may include a keypad including one or more keys 330. For example, the keypad may be implemented in hardware as a T9 or QWERTY keyboard of mobile device 311 and keys 330 may correspond to the physical keys of such a keyboard. Alternatively, keys 330 (and keyboard) of mobile device 311 may be implemented as "soft keys" of a virtual keyboard graphically represented in an appropriate arrangement via touch screen display 320. The soft keys presented on the touch screen display 320 may allow the user of mobile device 311 to invoke the same user interface functions as with the physical hardware keys. In some implementations, the microphone 302 and speaker 304 may be used as additional user interface elements, for audio input and output, including with respect to some functions related to the processing related to adjusting screen brightness and communication, as described herein.

For output, touch screen display 320 is a display device used to present information (e.g., text, video, graphics or other visible content) to the user of mobile device 311. Processor 312 controls visible display output on the LCD or other display element of the touch screen display 320 via a display driver 124, to present the various visible outputs to the device user.

In general, touch screen display 320 and touch sensors 122 (and one or more keys 330, if included) are used to provide the textual and graphical user interface for the mobile device 311. In an example, touch screen display 320 provides viewable content to the user at mobile device 311. Touch screen display 320 also enables the user to interact directly with the viewable content provided in the content display area, typically by touching the surface of the screen with a finger or an implement such as a stylus.

As shown in FIG. 3, the mobile device 311 also includes a touch detect circuit 128 coupled to touch sensors 122 for detecting the occurrence and relative location/position of each touch with respect to a content display area of touch screen display 320. In this example, touch detect circuit 128 is configured to provide processor 312 with touch-position information based on user input received via touch sensors 322. In some implementations, processor 312 is configured to correlate the touch position information to specific content being displayed within the content display area on touch screen display 320. The touch-position information captured by touch detect circuit 328 and provided to processor 312 may include, but is not limited to, coordinates identifying the location of each detected touch with respect to the display area of touch screen display 320 and a timestamp corresponding to each detected touch position.

In the example shown in FIG. 3, the mobile device 311 includes a microphone 302 for audio signal input and a speaker 304 for audio signal output. The microphone 302 and speaker 304 are communicatively coupled to a voice or audio encoder/decoder (vocoder) 306. For a voice telephone call, for example, the vocoder 306 provides two-way conversion between analog audio signals representing speech or other audio and digital samples at a compressed bit rate compatible with the digital protocol of wireless telephone network communications or voice over packet (e.g., Internet Protocol) communications. The vocoder, speaker and microphone may also be used as elements of the user interface during other operations of the device, including some types of transaction communications.

Also, as shown in FIG. 3, the mobile device 311 includes at least one transceiver (XCVR) 308, which may be a digital transceiver for digital wireless communications via a wide area wireless mobile communication network, although the mobile device 311 may include additional digital or analog transceivers (not shown). The transceiver 108 conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." For example, transceiver 308 provides two-way wireless communication of information including digitized audio signals, still image and/or video signals, web page information for display as well as web related inputs, and various types of mobile message communications to/from the mobile device 311. Transceiver 108 connects through radio frequency (RF) send-and-receive amplifiers (not separately shown) to an antenna 309. Transceiver 308 may also support various types of mobile messaging services, such as short message service (SMS), enhanced messaging service (EMS), and/or multimedia messaging service (MMS).

In an example, the transceiver 308 may be coupled to the processor 312 and operable to exchange communications. The processor 312 of the mobile device 311 may be further operable to perform additional functions, including functions to establish, using the transceiver, a connection with a server, such as App Setting Server 135 of FIG. 1, to exchange communications. Via the connection with the server, the mobile device 311 is able to obtain a standardized screen brightness adjustment model. The processor upon execution of the instance of the screen brightness adjustment application 342 may implement the standardized screen brightness adjustment model to determine a degree of screen brightness adjustment when adjusting the screen brightness.

The mobile device 311 may also include a Wi-Fi transceiver 310 and associated antenna 333. Although Wi-Fi is used here as the example, the transceiver 310 may take the form of any available two-way wireless local area network transceiver of a type that is compatible with one or more standard protocols of communication implemented in wireless local area networks, such as one of the Wi-Fi standards under IEEE 802.11 and/or WiMAX.

The mobile device 311 further includes a processor 312, which serves as a programmable controller for mobile device 311 by configuring mobile device 311 to perform various operations, for example, in accordance with instructions or programming executable by processor 312. For example, such operations may include various general operations of the mobile device 311 as well as operations related to the screen brightness adjustment as described herein. A flash memory 314 may be used to store, for example, programming or instructions for execution by the processor 312. Depending on the type of device, the mobile device 311 stores and runs an operating system through which specific applications may be run on the device. Examples of operating systems include Android, Apple iOS, Microsoft Windows OS, Bada, Tizen, Symbian OS, Blackberry OS, or the like. Flash memory 114 may also be used to store mobile configuration settings for different mobile applications or services executable at mobile device 311 (using processor 312). Mobile device 311 may also include a non-volatile random-access memory (RAM) 116 for a working data processing memory. The RAM memory 316 or storage 337 may be coupled to the processor 312 and operable to store programming code executable by the 312 processor. An ambient light sensor 350 may be coupled to the processor and operable to provide an indication of ambient light in an environment of the mobile device 311. In some examples, the ambient light sensor 350 may be a web camera or a mobile device camera that may be used to measure the ambient light without capturing an image that renders any recognizable features of a person, place or thing.

Alternatively, or in addition, applications may be stored in storage 337, which may be a solid-state memory storage or other memory device suitable for storing applications. In one example, the storage 337 may be a separate chip that includes tamperproof storage and execution memory and is configured to communicate with operating system. The storage 337 may, for example, store an instance of a screen brightness adjustment application 342 for processing the screen brightness adjustment of the mobile device 311. Other applications such as 344 may also be stored in storage 337.

The logic implemented by the processor 312 of the mobile device 311 configures the processor 312 to control various functions as implemented by the mobile device 311. The logic for a processor may be implemented in a variety of ways, but in our example, the processor logic is implemented by programming for execution by the microprocessor 312.

The mobile device 311 may include other components that are not shown but that may provide data or information for use by, or as an input to derive information, such as velocity or the like, the screen brightness adjustment application 342 or screen brightness adjustment model 147 (which may be a standardized model) of FIG. 1, such as an accelerometer, a barometer, a camera, or the like.

In an operational example, the processor 312 may be operable to receive an input for a screen brightness adjustment received from a respective input device of the one or more input devices. A content deliver application presenting screen content on the display device may be identified when the input for the screen brightness adjustment is received. In the example, the identified application is identified by an identifier, such as an application name, a numerical identifier, an alphanumerical identifier, a commercial or brand name, or the like.

The identifier of the identified application may be input into a machine learning algorithm, such as a first machine learning algorithm described herein. Alternatively, or in addition to the identifier of the identified application, the histogram-related information of the presented content may be input into the machine learning algorithm. The machine learning algorithm may be operable to categorize screen content based on the identified application, histogram-related information, and, in some examples, other information, such as time of day, user history with the identified application, or the like. For example, in response to an output from the machine learning algorithm, the processor 312 may be operable to categorize the screen content being presented on the touch screen display device 320 and output an indication of the categorized screen content. For example, the indication of the categorized screen content may be a numerical indication, alphanumeric indication or the like.

In the example, the ambient light sensor 350 may measure the ambient light and output an ambient light indication. The processor 312 may receive an ambient light indication from the ambient light sensor 350. The screen brightness adjustment application 342 may access a screen brightness adjustment model, such as 147 of FIG. 1 via an application setting server, such as 135 of FIG. 1. The screen brightness adjustment model 147 may be stored as part of the screen brightness adjustment application 342 programming code in the storage 337, in the flash memory 314. Alternatively, or in addition, the screen brightness adjustment model 147 may be executed and maintained by the application setting server 335. In such an example, the mobile device 311 may communicate with the application setting server 335, and the application setting server 335 may be operable to provide copies of the screen brightness adjustment application 149 to the mobile device 311.

In an example, the screen brightness adjustment application 342 may access different parts of the operating system and, if provided with the appropriate permissions, may access processes of different applications related to content presentation of screen content. For example, the screen brightness adjustment application 342 may obtain data or information from the mobile device operating system when rendering, from a graphical user interface that is rendering information, or the like. The type and/or manufacturer of the mobile device may be relevant as some of the display system settings may be dependent upon the hardware and hardware configuration of the mobile device. The screen brightness adjustment application 342 may, for example, be operable to determine what is about to be, or what is being, rendered and, depending upon the mobile device operating system, may have access to a graphical rendering library that is called by the respective mobile device operating system. For example, the screen brightness adjustment application 342 may operate in a manner similar to a screen capture and screen sharing application with regard to the screen content aspects of the screen content determination functions and operations of the screen brightness adjustment application.

The screen brightness adjustment application 342, when executed by the processor 312, may input the application name, an indication of the categorized screen content, and the ambient light indication into the screen brightness adjustment model 147. Based on the output from the screen brightness adjustment model, the processor 312 may provide signals to the display driver 324 to adjust the screen brightness.

In addition, the output from the screen brightness adjustment model 147 may be stored in the storage 337 or the flash memory 314. The output from the screen brightness adjustment model 147 may be stored as part of a screen brightness adjustment history 348. Alternatively, or in addition, a list of applications that are operable to output screen content may also be stored in the storage 337 or the flash memory 314. In an example, the list of applications that are operable to output screen content may also be stored with information indicating that a respective application is executing on a processor of the mobile device.

In an example, using the stored output of the screen brightness adjustment model 147, the screen brightness may be adjusted based on the output from the screen brightness adjustment model and a current screen brightness setting (which may also be stored, for example, in the flash memory 314 or may be retrieved from the mobile device operating system). For example, the processor 312 may obtain the current screen brightness setting (from a memory or the operating system) and using the stored output of the screen adjustment model 147, may determine a degree of screen brightness adjustment based on, for example, a difference between the current screen brightness setting and the output from the screen brightness adjustment model 147. Alternatively, the current screen brightness setting and the output from the screen brightness adjustment model 147 may be input into a machine learning algorithm or the like for determining of the degree of the screen brightness adjustment.

The processor 312 of the mobile device 311 may be further operable to determine the degree of screen brightness adjustment. For example, the degree of screen brightness adjustment may be determined by inputting one or more of the current screen brightness setting, screen brightness adjustment history 348 (which may be a collection of previous screen brightness adjustments over some period of time), or the output from the screen brightness adjustment model, into a machine learning algorithm, such as a rule-based algorithm, an unsupervised clustering algorithm, or a supervised clustering algorithm. The machine learning algorithm, whether a rule-based algorithm, an unsupervised clustering algorithm, or a supervised clustering algorithm, may be configured to generate a value related to the degree of screen brightness adjustment.

In an example that may occur for subsequent screen brightness adjustments, the processor 312 may, for example, obtain a screen shot of the screen content being presented on the display device 320. The processor 312 may process the obtained screen shot to gather pixel luminance intensity values. The processor 312 may input the gathered pixel luminance intensity values into a machine learning algorithm, such as a categorical neural network, for example. In the example, the output from categorical neural network may be a screen content categorization value indicative of a category of the screen content. The processor 312 may process the screen content categorization value for use as the indication of the categorized screen content. The categorized screen content may be used in determining whether screen brightness adjustment is appropriate and the degree of the screen brightness adjustment.

The structure and operation of the mobile device 311, as outlined above, were described to by way of example, only.

In addition to the foregoing examples, an example of a non-transitory computer-readable medium product that causes a processor, such as 312, to perform various functions related to adjusting screen brightness is disclosed. For example, the app setting server 135 of FIG. 1 may provide the screen brightness adjustment application 149 as a computer product to a mobile device, such as 110 or 115 of FIG. 1.

Figure 4:
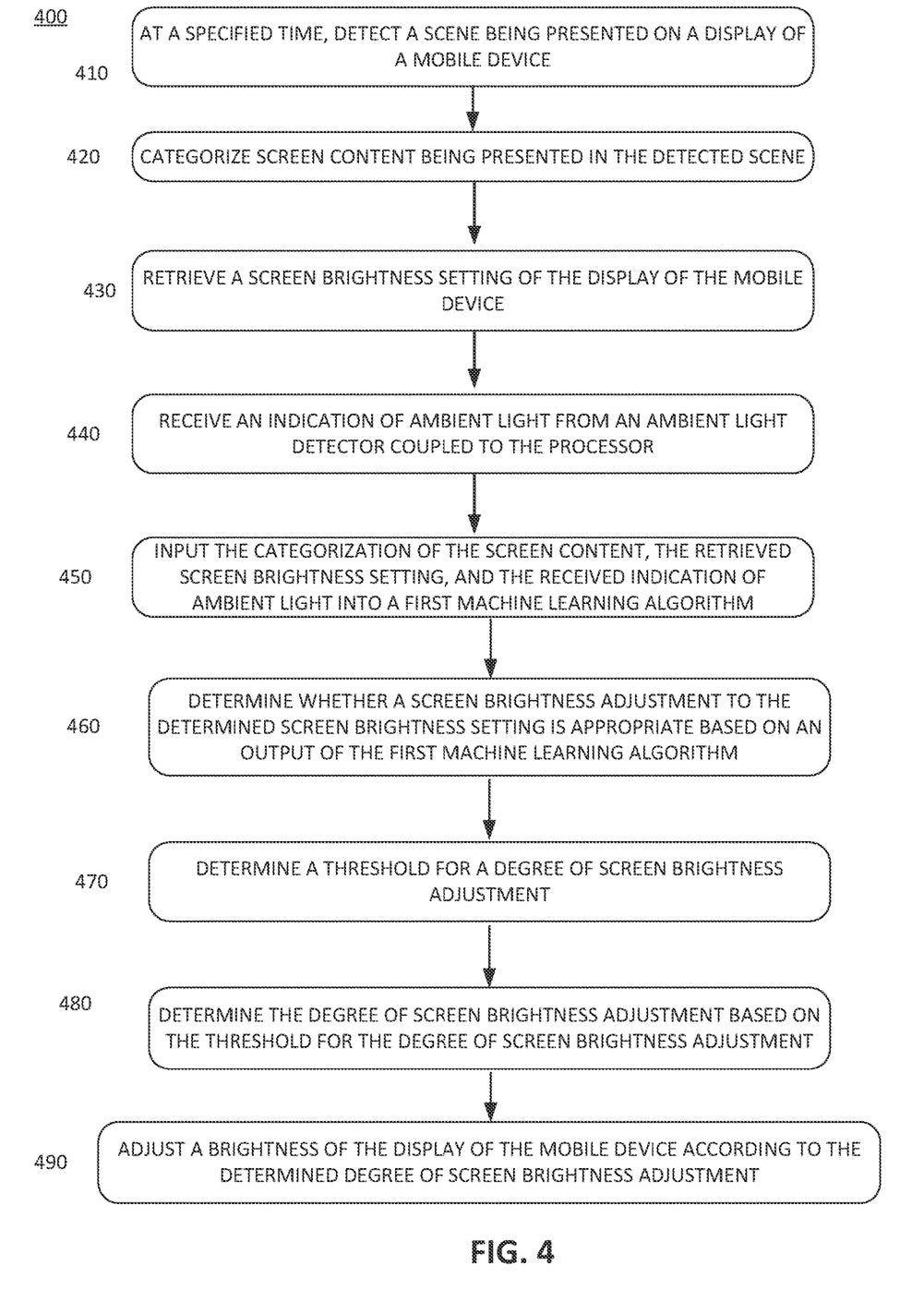
FIG. 4 shows a flow chart of an example of a computer-readable programming code product for adjusting screen brightness according

FIG. 4 is an example of a computer product, a non-transitory computer-readable medium embodied with programming code may be provided that enables a processor to perform various functions and processes, such as process 400. The programming code may be a screen brightness adjustment application or the like. The process 400 may include at a determined or specified time, detecting a scene being presented on a display of a mobile device. For example, the processor when executing the programming code may begin a process to determine the specified time to detect a scene by receiving an input from a component of the mobile device (410). For example, the input may be an ambient light value from the ambient light sensor, an input from a user interface, such as touch screen 320 of FIG. 3, a request to change the screen brightness, a detection of a different application presenting a different scene on the mobile device display device, a detection of a selection of a different application to present a different scene on the mobile device display, or the like. In response to the input, the At 420, the screen content being presented in the detected scene may be categorized in a manner described previously. In addition, the processor, when executing the programming code, may retrieve a screen brightness setting of the display of the mobile device (430). The retrieved screen brightness setting may be the current screen brightness setting, a screen brightness setting for an open application on the mobile device, or the like. The processor may also receive an indication of ambient light from an ambient light sensor coupled to the processor (440). The processor executing the programming code may input the category of the categorized screen content, the retrieved brightness setting, and the received indication of ambient light into a first machine learning algorithm (450). In this example, the first machine learning algorithm may be a rules-based algorithm, but, of course, other machine learning algorithms may be used, such as a neural network or the like.

At 460, the processor may determine whether a screen brightness adjustment of the determined screen brightness setting is appropriate based on an output of the first machine learning algorithm. For example, the processor when determining which of a number of screen brightness adjustment settings to select may receive a categorization of the screen content being presented in the detected scene as a video. The processor may also receive the indication of the ambient light is a value over a predetermined ambient light threshold.

In an example of step 460, values related to the received categorization of the screen content, such as video in this example, may be input with other values, such as a retrieved screen brightness setting and ambient light indication, to the first machine learning algorithm to determine whether a screen brightness adjustment is appropriate (i.e., needed or desired based on user preferences, a content presentation setting of an application or the like).

For example, the video categorization may have a corresponding value or the like, and the indication of the ambient light may have a value that has to be over a predetermined ambient light threshold. Both the value related to the video categorization and the indication of the ambient light may be used as inputs into the first machine learning algorithm. In the example, the output from the first machine learning algorithm may be a value indicating that a screen brightness adjustment is appropriate.

At 470, the processor may determine a threshold for a degree of screen brightness adjustment. The threshold may limit the degree of screen brightness adjustment according to conditions as discussed herein. For example, the determination of the threshold may be a rule-based determination, a user preference setting, a setting determined based on the history of user preferences, a setting provided by an external server such as an application setting server like 335 of FIG. 1, a combination of conditions as discussed herein (e.g. ambient light, user preferences, category of screen content and similar conditions), or the like. For example, the determination of the threshold may be an evaluation of a look-up table that correlates values of output from the first machine learning algorithm to a degree of screen brightness adjustment, or a rule-based system that evaluates the output value against various rules related to the degree of screen brightness adjustment.

Alternatively, a second machine learning algorithm may be used to determine the threshold for the degree of screen brightness adjustment. In an example, the second machine learning algorithm may include a screen brightness adjustment history as an input. For example, the screen brightness adjustment history may include information related to each particular screen brightness adjustment such as the degree of screen brightness adjustment, the screen brightness adjustment setting at the current time which the screen brightness was adjusted, the application presenting screen content, the category of the screen content, ambient lighting measurement, user preference settings, a particular time period for a respective application (based on the user trying to wake the screen to increase brightness) or the like.

In addition, or alternatively, in examples in which an application presenting content is identified, inputs may be received by accessing the screen brightness adjustment history and retrieving a history of screen brightness values correlated to when the identified application previously presented scenes on the display of the mobile device. In such an example, the identified application and history of screen brightness values may be used as inputs into the second machine learning algorithm.

In an example, the step at 470 may include a processor retrieving from a memory a history of previous screen brightness adjustment values. In addition to previous screen brightness adjustment values, the retrieved history may include a history of screen brightness settings, the history of screen brightness values correlated to when the identified application previously presented scenes on the display, and a history of indications of the categorized screen content being presented in the detected scene. Values related to each of these parameters may be used to determine the threshold for the degree of screen brightness adjustment. For example, some or all of the above values from each of the respective histories may be input into the second machine learning algorithm. In an example, the processor may receive an output from the second machine learning algorithm, which may be a value or range of values. For example, the output may be a precise value, a value with a plus/minus tolerance centered around the value, a value with a plus/minus tolerance not centered around the value, or a range of values. The processor executing the programming code may process the output value from the second machine learning algorithm to determine the threshold for the degree of screen brightness adjustment. For example, processing of the output value from the second machine learning algorithm may include an evaluation of the output value with respect to a look-up table that correlates the output value to a degree of screen brightness adjustment, or a rule-based system that evaluates the output value against various rules related to the degree of screen brightness adjustment.

Alternatively, the screen brightness adjustment history may be used in training the second machine learning algorithm. Such a screen brightness adjustment history may be stored in a memory of the mobile device, such as flash memory 114 of the mobile device example of FIG. 2.

For example, the processor may download the second machine learning algorithm, for example, from an application setting server or a remote storage. In one or more of the examples, the second machine learning algorithm may include predetermined input parameters. For example, an input parameter may be a parameter related to: a time of day, a location of the mobile device, a velocity of the mobile device, a battery life of the mobile device, an ambient light sensor compensation (some ambient light sensors in particular models of mobile devices may have errors that require compensation), or a manufacturer of the mobile device.

The processor, at 480, may determine the degree of screen brightness adjustment based on the threshold for the degree of screen brightness adjustment. For example, the threshold for the degree of screen brightness adjustment may be 5%, the determined degree of screen brightness adjustment may be 7%. So accordingly, the processor may adjust a brightness of the display of the mobile device according to the determined degree of screen brightness adjustment (490). Alternatively, the In a particular example, the mobile device may be presenting screen content, such as a QR code or other code, that is categorized as a machine-readable code. Based on the category of screen content being a machine-readable code, a threshold of the degree of screen brightness adjustment (as determined by the second machine learning algorithm or using a rule-based model) may be set at 0% meaning there is no limit on how bright the screen on a display of the mobile device may be. In addition, the output of a first machine learning algorithm, which may be a neural network, a rule-based model or the like, may indicate a screen brightness adjustment of 100% of the possible screen brightness (regardless of detected ambient light). The parameters of the machine learning algorithms may be set to provide a same response whenever a category for a machine-readable code is input into the respective machine learning algorithms to ensure that a machine-readable code is presented at maximum screen brightness so a screen reading device may easily read the machine-readable code. Of course, this machine-readable code example is but one of many uses of the disclosed process examples.

The disclosed process and computer-readable medium examples also implement machine learning algorithms or models. Examples of the machine learning algorithms or models may include a neural network classifier, an example of which may be a convolutional neural network, a supervised machine learning algorithm (such as a regression algorithm, linear regression algorithm, or the like), or an unsupervised machine learning algorithm (such as a k-means, Gaussian mixtures, or the like), to determine a category of screen content, thresholds for a screen brightness adjustment, or a degree of screen brightness adjustment. The various machine learning algorithms that may be used in the foregoing examples of FIGS. 1-4 may use one or more different data sets to train the respective machine learning algorithm. In the screen content categorization examples, machine learning algorithms, such as convolutional neural networks, that provide image classification are known and may have already been trained. Others may have rudimentary, general training and require a specific training data set representative of the specific results that the machine learning algorithm is intended to produce. In such an example, the machine learning algorithm may be trained based on a user's history, or similar users' histories, for viewing particular screen content, such as gaming applications, specific video genres from content streaming services, or the like. Of course, user history of the categories of screen content viewed may also be used to train, or further train, other types of machine learning algorithms. For example, if categorized screen content is available as a training data set, a supervised machine learning algorithm may be used. The machine learning algorithm may be configured to continuously update any parameters based on new data (e.g., generated in response to user corrections to screen brightness adjustments) and conditions.

In addition, the parameters (e.g., a number of layers, weights or biases) of a machine learning algorithm may be selected to ensure that execution of the machine learning algorithm is as fast as possible but balanced against a reasonable tolerance for errors.

Various processes and examples have been described for adjusting a screen brightness of a mobile device based on the content being presented on a display screen of the mobile device, which may be a smart phone device, such as the example in FIG. 3, a laptop device, a desktop computer, a tablet or the like.

Figure 5:
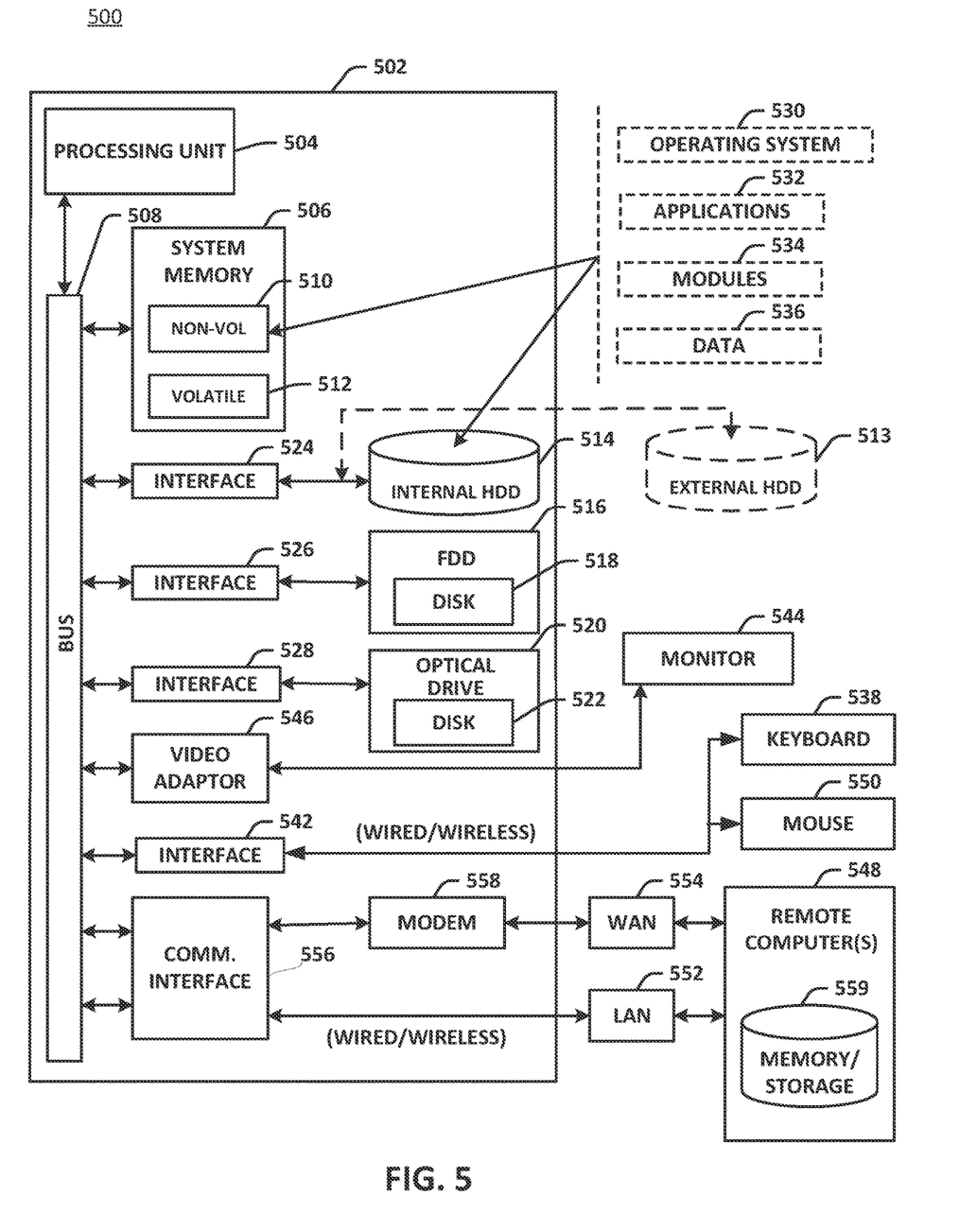
FIG. 5 illustrates an example of a computing architecture suitable for implementing the examples illustrated in FIGS. 1, 2 and 4.

FIG. 5 illustrates an example of an example of a computing architecture 500 suitable for implementing various examples as previously described. In one example, the computing architecture 500 may include elements of or be implemented as part of system 100 of FIG. 1. Examples of a laptop device, a desktop computer, or a tablet may also include elements or components shown in the computer architecture 500 example of FIG. 5.

As used in this application, the terms "system" and "component" are intended to refer to a computer-related entity, either hardware, a combination of hardware and software, software, or software in execution, examples of which are provided by the computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further examples, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The examples, however, are not limited to implementation by the computing architecture 500.

As shown in FIG. 5, the computing architecture 500 includes a processing unit 504, a system memory 506 and a system bus 508. The processing unit 504 can be any of various commercially available processors.

The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures. Interface adapters may connect to the system bus 508 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 500 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Examples may also be at least partly implemented as instructions contained in or on a non-transitory computer-readable medium, which may be read and executed by one or more processors to enable performance of the operations described herein.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated example shown in FIG. 5, the system memory 506 can include non-volatile memory 510 and/or volatile memory 512. A basic input/output system (BIOS) can be stored in the non-volatile memory 510.

The computer 502 may include various types of computer-readable storage media in the form of one or more lower speed memory units, including an internal hard disk drive (HDD) 514 (or external hard disk drive (HDD) 513), a magnetic floppy disk drive (FDD) 516 to read from or write to a removable magnetic disk 518, and an optical disk drive 520 to read from or write to a removable optical disk 522 (e.g., a CD-ROM or DVD). The internal HDD 514 or external HDD 513, FDD 516 and optical disk drive 520 can be connected to the system bus 508 by an HDD interface 524, an FDD interface 526 and an optical drive interface 528, respectively. The HDD interface 524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of computer program modules can be stored in the drives and memory 510, 512, including an operating system 530, one or more application programs 532, other program modules 534, and program data 536. In one example, the one or more application programs 532, other program modules 534, and program data 536 can include, for example, the various applications and/or components of the computing architecture 500.

A user can enter commands and information into the computer 502 through one or more wire/wireless input devices, for example, a keyboard 538 and a pointing device, such as a mouse 550. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 504 through communication interface 556 that is coupled to the system bus 508 but can be connected by other interfaces such as a parallel port, IEEE 1394 serial port, a game port, a USB port, an IR interface, and so forth.

A monitor 544 or other type of display device is also connected to the system bus 508 via an interface, such as a video adaptor 546. The monitor 544 may be internal or external to the computer 502. In addition to the monitor 544, a computer typically includes other peripheral output devices, such as speakers, printers, and so forth.

The computer 502 may operate in a networked platform using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all the elements described relative to the computer 502, although, for purposes of brevity, only a memory/storage device 559 is illustrated. The logical connections depicted include wire/wireless connectivity to a local area network (LAN) 552 and/or larger networks, for example, a wide area network (WAN) 554. Such LAN and WAN networking platforms are commonplace in offices and companies, and facilitate enterprise-wide computer networks, such as intranets, all of which may connect to a global communications network, for example, the Internet.

When used in a LAN networking platform, the computer 502 is connected to the LAN 552 through a wire and/or wireless communication interface 556. The communication interface 556 can facilitate wire and/or wireless communications to the LAN 552, which may also include a wireless access point disposed thereon for communicating with the wireless functionality of the communication interface 556.

When used in a WAN networking platform, the computer 502 can include a modem 558, or is connected to a communications server on the WAN 554 or has other means for establishing communications over the WAN 554, such as by way of the Internet. The modem 558, which can be internal or external and a wire and/or wireless device, connects to the system bus 508 via the input device interface 542. In a networked platform, program modules depicted relative to the computer 502, or portions thereof, can be stored in the memory/storage device 559. It will be appreciated that the network connections shown are exemplary and other means of establishing a communications link between the computers can be used.

The computer 502 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-5 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

It will be appreciated that the example components and devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in examples.

At least one computer-readable storage medium may include instructions that, when executed, cause a system to perform any of the computer-implemented methods described herein.

Some examples may be described using the expression "one example" or "an example" along with their derivatives. These terms mean that a particular feature, structure, or characteristic described in connection with the example is included in at least one example. The appearances of the phrase "in one example" in various places in the specification are not necessarily all referring to the same example. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A process is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more examples. Rather, the operations are machine operations.

Some examples may be described using the expression "coupled" and "connected" along with their derivatives. These terms are not necessarily intended as synonyms for each other. For example, some examples may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

As used in this application, the terms "system" and "component" are intended to refer to a computer-related entity, either hardware, a combination of hardware and software, software, or software in execution, examples of which are provided by the examples in FIGS. 1-5. For example, a component can be, but is not limited to being, a process running on a processor, a processor, a hard disk drive, multiple storage drives (of optical and/or magnetic storage medium), an object, an executable, a thread of execution, a computer program, and/or a computer. By way of illustration, both an application running on a server or processor and the server or processor can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

Various examples also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single example for streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A method, comprising:
   detecting an input to a mobile device requesting a screen brightness adjustment;
   identifying an application presenting screen content on a display device of the mobile device after the input for the screen brightness adjustment is detected, wherein the identified application is identified by an application identifier;
   inputting the application identifier and histogram related information into a machine learning algorithm, wherein the machine learning algorithm is operable to categorize screen content;
   based on an output from the machine learning algorithm, categorizing the screen content being presented on the display device;
   receiving an ambient light indication from an ambient light sensor;
   accessing a screen brightness adjustment model;
   inputting an application name, an indication of the categorized screen content, and the ambient light indication into the screen brightness adjustment model; and
   adjusting a screen brightness based on an output from the screen brightness adjustment model.

2. The method of claim 1, further comprising:
   storing the output from the screen brightness adjustment model in a memory as part of a screen brightness adjustment history;
   obtaining a current screen brightness setting; and
   determining a degree of screen brightness adjustment from the current screen brightness setting and the output from the screen brightness adjustment model.

3. The method of claim 2, wherein determining the degree of screen brightness adjustment comprises:
   inputting one or more of the current screen brightness setting, the screen brightness adjustment history, or the output from the screen brightness adjustment model into a second machine learning algorithm, wherein the second machine learning algorithm is one of a rule-based algorithm, an unsupervised clustering algorithm, or a supervised clustering algorithm; and
   generating a value related to the degree of screen brightness adjustment.

4. The method of claim 1, wherein determining a degree of screen brightness adjustment comprises:
   establishing a connection with a server to exchange communications;
   obtaining a standardized screen brightness adjustment model; and
   implementing the standardized screen brightness adjustment model to determine the degree of screen brightness adjustment for use in adjusting the screen brightness.

5. The method of claim 4, wherein categorizing the screen content presented on the display device comprises:
   obtaining a screen shot of the screen content being presented; and
   processing the obtained screen shot to gather pixel luminance intensity values.

6. The method of claim 5, wherein categorizing the screen content presented on the display device further comprises:
   inputting the gathered pixel luminance intensity values into a categorical neural network; and
   outputting from the categorical neural network a screen content categorization value indicating a category of the screen content in the obtained screen shot.

7. The method of claim 6, wherein categorizing the screen content presented on the display device further comprises:
   processing the screen content categorization value for use as the indication of the categorized screen content.

8. A mobile device, comprising:
   a screen brightness adjustment application stored in a memory of the mobile device and executable by a processor of the mobile device,
   wherein execution of the screen brightness adjustment application enables the mobile device to perform functions, including functions to:
   detect an input to the mobile device requesting a screen brightness adjustment;
   identify an application presenting screen content on a display device of the mobile device after the input for the screen brightness adjustment is detected, wherein the identified application is identified by an application identifier;
   input the application identifier and histogram related information into a machine learning algorithm, wherein the machine learning algorithm is operable to categorize screen content;
   based on an output from the machine learning algorithm, categorize the screen content being presented on the display device;
   receive an ambient light indication from an ambient light sensor;
   access a screen brightness adjustment model;
   input an application name, an indication of the categorized screen content, and the ambient light indication into the screen brightness adjustment model; and
   adjust a screen brightness based on an output from the screen brightness adjustment model.

9. The mobile device of claim 8, wherein execution of the screen brightness adjustment application enables the mobile device to perform further functions, including functions to:
   store the output from the screen brightness adjustment model in the memory as part of a screen brightness adjustment history;
   obtain a current screen brightness setting; and
   determine a degree of screen brightness adjustment from the current screen brightness setting and the output from the screen brightness adjustment model.

10. The mobile device of claim 9, wherein execution of the screen brightness adjustment application enables the screen brightness adjustment application to determine the degree of screen brightness adjustment by performing functions to:
    input one or more of the current screen brightness setting, the screen brightness adjustment history, or the output from the screen brightness adjustment model into a second machine learning algorithm, wherein the second machine learning algorithm is one of a rule-based algorithm, an unsupervised clustering algorithm, or a supervised clustering algorithm; and
generate a value related to the degree of screen brightness adjustment.

11. The mobile device of claim 8, wherein upon execution of the screen brightness adjustment application, the screen brightness adjustment application is operable to perform functions to:
establish a connection with a server to exchange communications;
obtain a standardized screen brightness adjustment model; and
implement the standardized screen brightness adjustment model to determine a degree of screen brightness adjustment for use in adjusting the screen brightness.

12. The mobile device of claim 8, wherein upon execution the screen brightness adjustment application is further operable to categorize the screen content presented on the display device by performing functions to:
obtain a screen shot of the screen content being presented;
process the obtained screen shot to gather pixel luminance intensity values;
input the gathered pixel luminance intensity values into a categorical neural network;
output from the categorical neural network a screen content categorization value indicating a category of the screen content in the obtained screen shot; and
process the screen content categorization value for use as the indication of the categorized screen content.

13. A non-transitory computer readable medium embodied with programming code that when executed causes a processor to perform functions, including functions to:
detect an input to a mobile device requesting a screen brightness adjustment;
identify an application presenting screen content on a display device of the mobile device after the input for the screen brightness adjustment is detected, wherein the identified application is identified by an application identifier;
input the application identifier and histogram related information into a machine learning algorithm, wherein the machine learning algorithm is operable to categorize screen content;
based on an output from the machine learning algorithm, categorize the screen content being presented on the display device;
receive an ambient light indication from an ambient light sensor;
access a screen brightness adjustment model;
input an application name, an indication of the categorized screen content, and the ambient light indication into the screen brightness adjustment model; and
adjust a screen brightness based on an output from the screen brightness adjustment model.

14. The non-transitory computer readable medium of claim 13, further embodied with programming code that when executed causes a processor to perform further functions, including functions to:
store the output from the screen brightness adjustment model in a memory as part of a screen brightness adjustment history;
obtain a current screen brightness setting; and
determine a degree of screen brightness adjustment from the current screen brightness setting and the output from the screen brightness adjustment model.

15. The non-transitory computer readable medium of claim 14, wherein functions to determine the degree of screen brightness adjustment further comprise functions to:
input one or more of the current screen brightness setting, the screen brightness adjustment history, or the output from the screen brightness adjustment model into a second machine learning algorithm, wherein the second machine learning algorithm is one of a rule-based algorithm, an unsupervised clustering algorithm, or a supervised clustering algorithm; and
generate a value related to the degree of screen brightness adjustment.

16. The non-transitory computer readable medium of claim 13, further embodied with programming code to perform functions to:
establish a connection with a server to exchange communications;
obtain a standardized screen brightness adjustment model; and
implement the standardized screen brightness adjustment model to determine a degree of screen brightness adjustment for use in adjusting the screen brightness.

17. The non-transitory computer readable medium of claim 13, further embodied with programming code that when executed causes a processor to perform further functions, including functions to:
obtain a screen shot of the screen content being presented;
process the obtained screen shot to gather pixel luminance intensity values;
input the gathered pixel luminance intensity values into a categorical neural network;
output from the categorical neural network a screen content categorization value indicating a category of the screen content in the obtained screen shot; and
process the screen content categorization value for use as the indication of the categorized screen content.

18. The non-transitory computer readable medium of claim 13, wherein functions to determine a degree of screen brightness adjustment comprises functions to:
select a rule from a plurality of rules, wherein selection of the rule is based on a categorized screen content resulting from evaluating the screen content.

19. The non-transitory computer readable medium of claim 18, wherein functions to generate thresholds comprises functions to:
generate thresholds for use in the plurality of rules by applying a third machine learning algorithm to a history of brightness adjustments, wherein the third machine learning algorithm is a supervised machine learning algorithm.

20. The non-transitory computer readable medium of claim 19, wherein functions to determine the degree of screen brightness adjustment comprises functions to:
input ambient light readings included in the history of brightness adjustments into the third machine learning algorithm.

* * * * *